Figure 1:
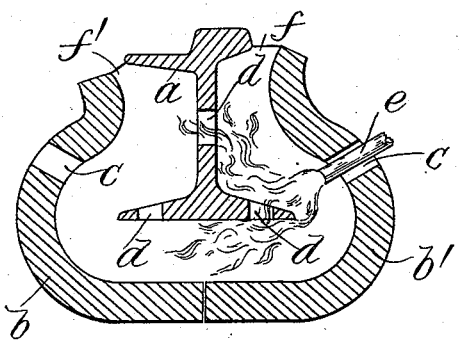

(No Model.) 2 Sheets—Sheet 1.

H. W. FALK.
METHOD OF AND MEANS FOR FORMING RAIL JOINTS.

No. 580,971. Patented Apr. 20, 1897.

Witnesses:
D. W. C. Tanner.
A. D. Lawrence.

Inventor:
Herman W. Falk,
By Barton & Brown
Attorneys.

(No Model.) 2 Sheets—Sheet 2.
H. W. FALK.
METHOD OF AND MEANS FOR FORMING RAIL JOINTS.

No. 580,971. Patented Apr. 20, 1897.

Witnesses:
Inventor:
Herman W. Falk.
By Barton & Brown
Attorneys.

United States Patent Office.

HERMAN W. FALK, OF MILWAUKEE, WISCONSIN, ASSIGNOR TO THE FALK MANUFACTURING COMPANY, OF SAME PLACE.

METHOD OF AND MEANS FOR FORMING RAIL-JOINTS.

SPECIFICATION forming part of Letters Patent No. 580,971, dated April 20, 1897.

Application filed February 4, 1897. Serial No. 621,975. (No model.)

*To all whom it may concern:*

Be it known that I, HERMAN W. FALK, a citizen of the United States, residing at Milwaukee, in the county of Milwaukee and State of Wisconsin, have invented a certain new and useful Improvement in Methods of and Means for Forming Rail-Joints, (Case No. 2,) of which the following is a full, clear, concise, and exact description, reference being had to the accompanying drawings, forming a part of this specification.

My invention relates to an improved method of and means for forming rail-joints, my object being to devise better means for the production of an entirely satisfactory union or joint for railway-rails.

The said invention which I herein describe consists of improvements upon the method of forming rail-joints set forth in United States Letters Patent No. 545,040 granted to Albert Hoffmann and myself August 20, 1895.

In the drawings forming a part of said Letters Patent is shown a sectional mold adapted to be placed over the ends of abutting rails which are to be united, the rail ends being previously cleaned and having a shim or wedge inserted between them to fill the intervening space should the said rails be slightly separated. The ends are then heated either by clamping the hot mold upon them or pouring molten metal through said mold until the rails are raised in temperature sufficiently to insure the union therewith of a body of metal which is cast in said mold about the bottom and sides of the rails at their joint. This mass of metal thus forms the separate rails into a continuous length and effects a more satisfactory joint than has previously been secured by other means.

My improvement upon the above may be briefly described as consisting in providing in the sides or walls of the mold wherein the joint is effected adjacent to the surfaces of the rail-ends which are to be heated an opening or openings through which flame or other superheated medium may be directed upon the inclosed portions of the rails, whereby the same are rapidly raised in temperature previous to fusing thereon the metallic union. The said opening or openings are then closed and the body of metal is cast upon the rail ends inclosed within said mold, joining the rails into a continuous length, as above set forth.

My invention further contemplates securing an additional and more perfect electrical union between the said rails, which consists in inserting an electrical bond, preferably of copper, between the rail ends previous to casting thereon the mass of metal and protecting said bond from heat by means of a mask or cover of some non-conducting body, such as clay.

I will describe the features of my invention more particularly by reference to the accompanying drawings, in which—

Figure 2:
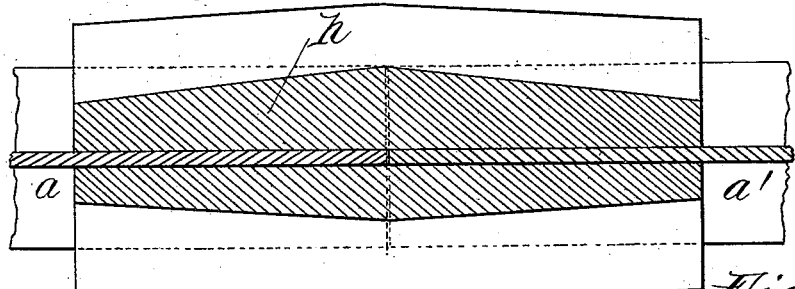
Figure 3:
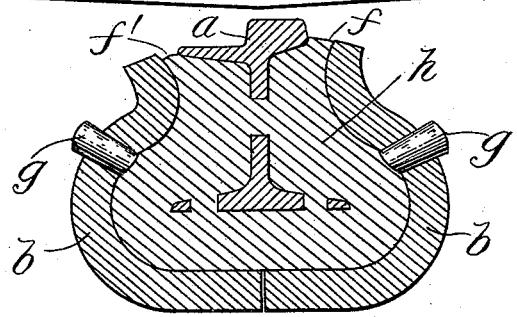
Figure 4:
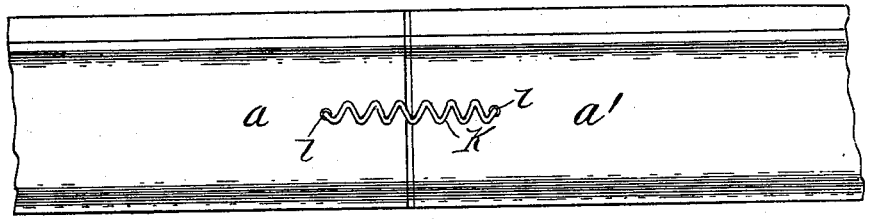
Figure 5:
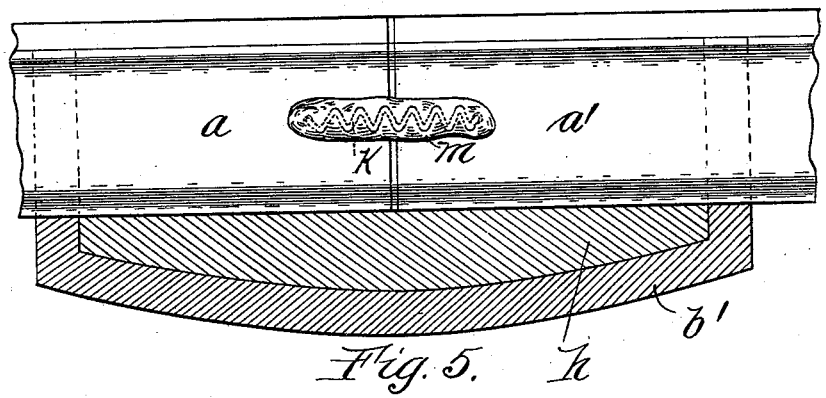
Figure 6:
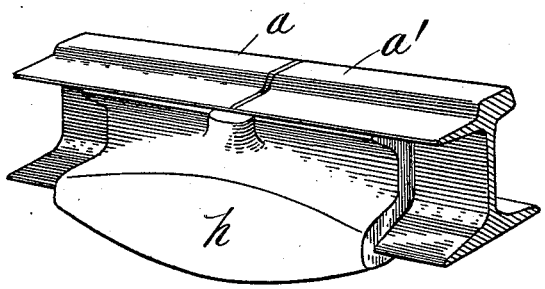

Figure 1 is a vertical sectional view of my improved mold, showing the rail in position and the nozzle of a gas-torch inserted in one of the twyers or openings therein, by which the rails are heated. Fig. 2 is a horizontal sectional view of a joint of the continuous rail produced by this method. Fig. 3 is a vertical sectional view showing the openings in the mold closed by means of plugs and the mass of metal cast within said mold. Fig. 4 illustrates the rail ends with an electrical bond uniting the same. Fig. 5 is a similar view showing the covering or mask in position with a portion of the mold in section, and Fig. 6 illustrates the completed rail-joint.

The same letter of reference is used to designate like parts in each of the several figures.

In following my improved method the ends of the rails $a$ $a'$ which are to be joined are first cleaned in order that the metallic body may be readily united with the surfaces thereof, after which the mold which is formed in sections $b$ $b'$ is placed in position upon the ends of the rails, as shown in the drawings.

In the walls or sides of the mold the openings or twyers $c$ are provided adjacent to the webs and base-flanges of the rail ends, in which are shown the holes $d$, preferably drilled in said parts to insure more rapid heating of the same and secure a firmer joint between said rails when the mass of metal is cast thereon.

Obviously the holes $d$ in the rail ends need not necessarily be provided, since the purposes which they serve may be substantially accomplished without employing this construction.

Through one of the openings $c$ in the mold the nozzle $e$ of a gas-torch is shown in position for heating the rail ends, from which a flame plays upon the parts and rapidly heats the same to the requisite temperature for fusing thereon the mass of metal constituting the union.

The sprue $f$ and vent or overflow $f'$, which are used in casting, may be closed, if desired, by any suitable means, such as a cover formed of metal or asbestos, whereby the heat is retained within the mold.

When the parts have been sufficiently heated, plugs $g$ are inserted in the openings $c$ of said mold and molten metal is poured into the sprue $f$, the said metal immediately uniting with the heated surfaces of $a$ and $a'$, forming therefrom practically a continuous rail.

In order to prevent the metal from fusing with the interior surfaces of the mold, said surfaces and the plugs $g$ are coated with graphite or similar material, which prevents this and permits the mold to be easily removed from the joint as soon as the casting has cooled.

The body of metal $h$ is preferably cast having its greatest cross-section at the point of contact of the rails, as indicated in the drawings, the mass thereof tapering from this point in either direction, which insures the maximum strength where it is most needed; and by providing the holes $d$, which in casting are filled by the metal constituting the mechanical bond, it will be seen a more rigid and permanent union of the individual rails is secured than is attained where this construction is lacking.

It may be found desirable or convenient to employ other means for heating the above mold than that specifically mentioned above, since a suitable superheated medium introduced within the mold through the openings $c$ would readily raise the parts to the requisite temperature.

It is apparent that the heating, when necessary to secure the proper union of the body of metal with the rail ends, is much more readily accomplished by thus introducing the heating medium through portions of the mold immediately adjacent to the surfaces with which union is desired than by the means suggested in the patent above mentioned.

Under some circumstances it may be found desirable to provide more perfect electrical connection for the rail ends than is furnished by the body of metal or union cast thereon. In such cases the method below described may be followed previous to casting a mass of metal upon said rail ends. A bond $k$, preferably of copper and formed to be somewhat extensible, as shown in the drawings, is inserted in openings $l$, provided therefor in the rail ends, electrical continuity between the bond and the said rails being secured in any suitable manner well known to the art. The bond $k$ thus forms perfect and independent electrical connection for the rails. Since copper is melted at a much lower temperature than iron or steel, it becomes necessary to protect the bond $k$ against the extreme heat developed both in casting the mass of metal upon the rail ends and during the process of heating, to which it is frequently necessary to subject the rails prior to casting thereon the said mass of metal uniting the same. I provide, therefore, a mask or covering $m$ for said bond, formed of a non-conducting material, such covering preferably consisting of clay. This covering serves to maintain the electrical bond intact and preserves it from fusion during the process of casting or of heating and casting, as the condition of the rails may require, since with clean new rails I have been able to secure satisfactory union of the parts without heating the rail ends previous to effecting the casting.

The mass of metal $h$ ordinarily will serve to electrically unite the rail ends, but under certain conditions the bond $k$ may be found desirable as a safeguard or to reduce the resistance of the rail-circuit.

Having now described my invention, what I claim as new, and desire to secure by Letters Patent, is—

1. The method of heating rail ends within a mold preparatory to casting thereon a bond or union, which consists in directing a current of superheated gas from the walls of the mold directly against the adjacent lower portions of said rails, whereby the surfaces thereof are raised to a fusing temperature, substantially as described.

2. The herein-described method of uniting rails, which consists in cleaning the ends thereof, placing over said ends a mold, impelling a superheated medium directly against the lower portions of said rail ends, and thereby raising the surfaces thereof to a fusing temperature, then casting upon said lower portions of the rail ends a mass of metal which unites said rails.

3. The method of joining rails which consists in cleaning the ends of the rails to be joined, adjusting thereon a mold, directing a current of superheated gas through the walls of said mold against the lower portions of the rails, whereby the surfaces of said portions are raised to a fusing temperature, and casting thereon a body of metal which unites with the metal of said rails and forms therefrom practically a continuous rail, substantially as described.

4. The method of electrically and mechanically uniting rails, which consists in cleaning the ends thereof, electrically bonding said ends, protecting the said bond against extreme heat, placing over the rail ends a mold, and casting upon said lower portions of the rail ends a mass of metal which unites said rails.

5. The combination, in a mold for uniting rails, with the sectional parts thereof $b$ $b'$ adapted to be removably secured to the rail ends, of a mask or covering $m$ adapted to protect from extreme heat parts within the interior of said mold, and means for heating the rail ends when the mold is placed in position thereon, substantially as described.

6. The combination with the rails $a$ $a'$, of a bond $k$ adapted to electrically unite the said rails at their joint, a mask or covering $m$ for said bond adapted to shield the same from extreme heat, and a body of metal cast upon said rail ends whereby the same are firmly united, substantially as described.

7. In a mold for uniting rails, the combination with mold-sections $b$ $b'$ adapted to be removably secured upon the rails, of twyers $c$ provided in the walls thereof adjacent to the lower portions of said rails, an opening in the upper portion of said mold, through which molten metal is adapted to be poured, and means for directing through said twyers a superheated gas or medium against the lower portion of the inclosed rails.

8. In a mold for fusing a bond or union upon rail ends, the combination with mold-sections $b$ $b'$ adapted to be removably secured to said rail ends, of twyers or openings $c$ provided in the walls of said mold adjacent to the lower portions of the rails, means for directing a superheated gas through said openings against the adjacent portions of the rails, openings $f$ $f'$ through which the molten metal for forming the union or bond flows, and plugs $g$, adapted to be inserted in the said twyers when the metal is to be cast upon the rail ends, substantially as described.

In witness whereof I hereunto subscribe my name this 2d day of February, A. D. 1897.

HERMAN W. FALK.

Witnesses:
CHARLES A. BROWN,
A. L. LAWRENCE.